United States Patent
Becker et al.

(12) 
(10) Patent No.: US 11,767,170 B2
(45) Date of Patent: Sep. 26, 2023

(54) STACK STORAGE ASSEMBLY

(71) Applicant: Jungheinrich Aktiengesellschaft, Hamburg (DE)

(72) Inventors: Michael Becker, Hainburg (DE); Jörg Cavelius, Bad Vilbel (DE); Markus Liebhaber, Oberursel (DE); Timm Morawietz, Tholey-Überroth (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 0 days.

(21) Appl. No.: 17/411,550

(22) Filed: Aug. 25, 2021

(65) Prior Publication Data

US 2022/0063916 A1 Mar. 3, 2022

(30) Foreign Application Priority Data

Aug. 26, 2020 (EP) .................................... 20192798

(51) Int. Cl.
*B65G 1/14* (2006.01)
*B65G 1/04* (2006.01)

(52) U.S. Cl.
CPC ............. *B65G 1/14* (2013.01); *B65G 1/0414* (2013.01); *B65G 1/0471* (2013.01)

(58) Field of Classification Search
CPC ....... B65G 1/14; B65G 1/0414; B65G 1/0471
See application file for complete search history.

(56) References Cited

U.S. PATENT DOCUMENTS

| | | | | |
|---|---|---|---|---|
| 3,817,406 A | * | 6/1974 | Sawada ................ | B65G 1/0414 414/281 |
| 4,352,617 A | * | 10/1982 | Sakai ................... | B65G 57/303 414/790.1 |
| 4,684,308 A | * | 8/1987 | Dorner ................. | B65G 57/302 53/541 |
| 5,156,514 A | * | 10/1992 | Zah ...................... | B65G 1/1378 414/285 |

(Continued)

FOREIGN PATENT DOCUMENTS

| | | | | |
|---|---|---|---|---|
| DE | 19849391 A1 | * | 5/2000 | .......... B65G 57/302 |
| GB | 1426023 A | * | 2/1976 | .......... B65G 1/0414 |

(Continued)

*Primary Examiner* — Stanton L Krycinski
(74) *Attorney, Agent, or Firm* — GREENBLUM & BERNSTEIN, P.L.C.

(57) ABSTRACT

A stack storage assembly with container stacking spaces, a charging space arranged below the container stacking spaces, and a charging vehicle movable in the charging space having a hoisting device to move a container into or out of a container stacking space. Each of the container stacking spaces has, at a lower end, a retaining device with at least one retaining element, which is movable, via an actuating device arranged on the charging vehicle, between a retaining position in which the at least one retaining element holds the container arranged in the container stacking spaces and a release position in which the container is relocated past the retaining element. The charging vehicle has at least one fixing element positionable into a fixing position to interact with the at least one retaining element located in the release position, and to hold the at least one retaining element in the release position.

13 Claims, 3 Drawing Sheets

(56) References Cited

U.S. PATENT DOCUMENTS

| | | | |
|---|---|---|---|
| 11,230,446 B2* | 1/2022 | Morawietz | B65G 1/0471 |
| 11,261,026 B2* | 3/2022 | Cavelius | B65G 57/02 |
| 2014/0308107 A1* | 10/2014 | Nickles | B65G 57/302 |
| | | | 29/418 |
| 2016/0060037 A1* | 3/2016 | Razumov | B65G 1/065 |
| | | | 700/216 |
| 2021/0052070 A1* | 2/2021 | Cavelius | A47B 87/0246 |
| 2021/0052071 A1* | 2/2021 | Cavelius | B65G 1/02 |
| 2021/0053777 A1* | 2/2021 | Harting | B65G 1/0471 |
| 2021/0188546 A1* | 6/2021 | Becker | B65G 60/00 |

FOREIGN PATENT DOCUMENTS

| | | | | |
|---|---|---|---|---|
| JP | 59108618 A | * | 6/1984 | |
| NL | 9300418 A | * | 10/1994 | A01G 9/143 |
| WO | WO-2010097425 A1 | * | 9/2010 | B65G 57/302 |

\* cited by examiner

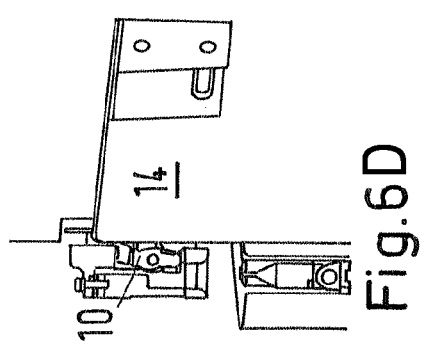
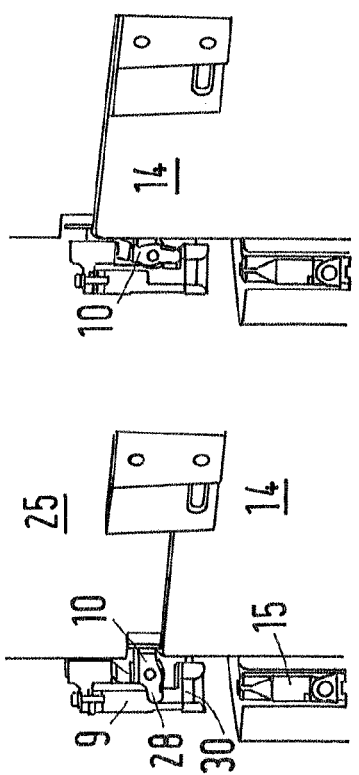
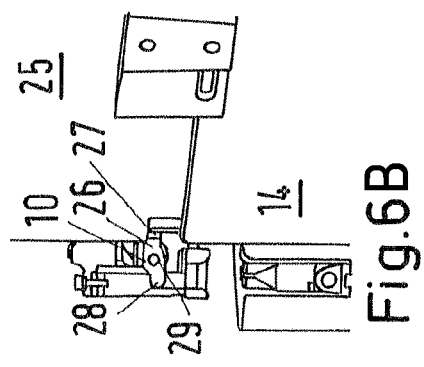
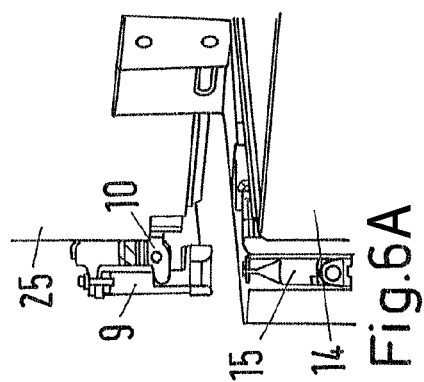
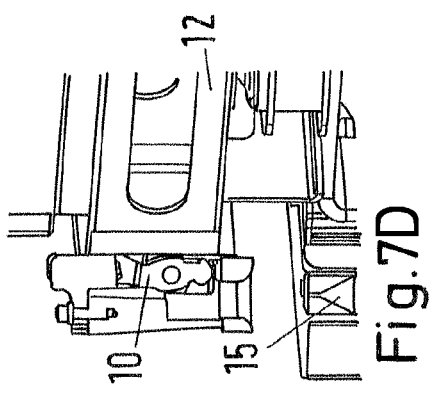
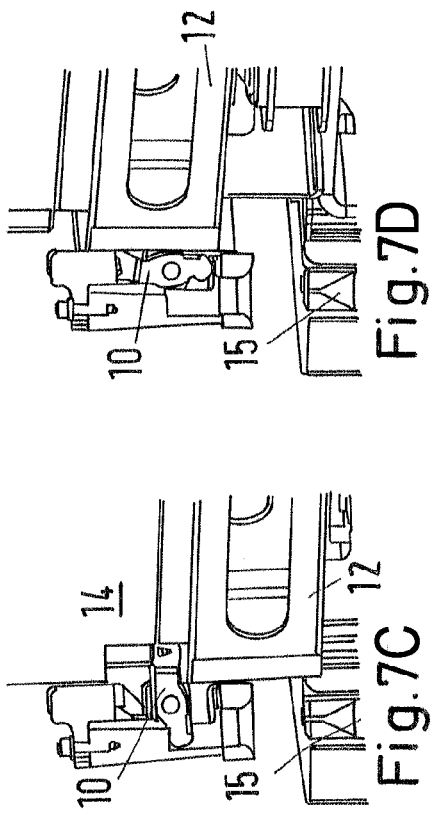
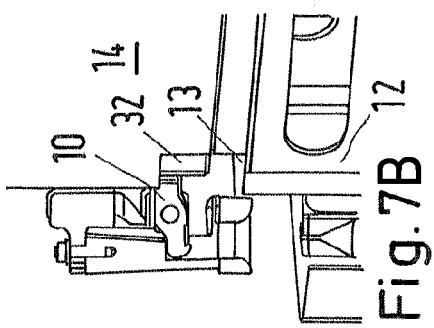
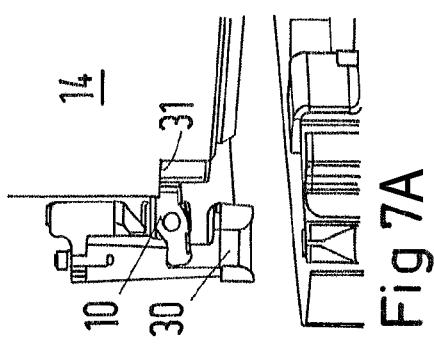
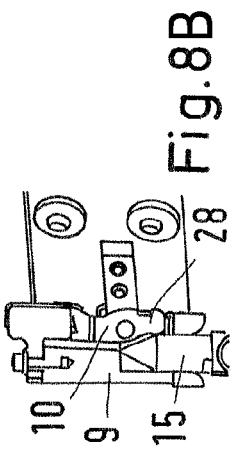
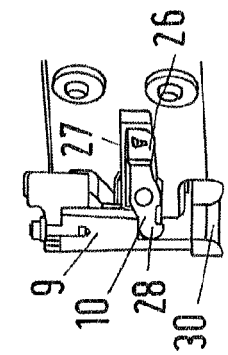

STACK STORAGE ASSEMBLY

CROSS-REFERENCE TO RELATED APPLICATION

This application claims the right of foreign priority under 35 U.S.C. § 119(a) to Europe Application No. EP 20192798.5 filed Aug. 26, 2020, the disclosure of which is expressly incorporated by reference herein in its entirety.

BACKGROUND

1. Field of the Invention

The present invention relates to a stack storage assembly with a plurality of container stacking spaces, a charging space, which is arranged below the container stacking spaces in the direction of gravity, and a charging vehicle that can move in the charging space, which has a hoisting device that can be used to relocate a container into a container stacking space or out of a container stacking space. Each container stacking space has a retaining device with at least one retaining element at its lower end in the direction of gravity, which can be moved by an actuating device arranged on the charging vehicle between a retaining position in which it holds a container arranged in the container stacking space against the force of gravity, and a release position in which the container can be relocated past the retaining element.

2. Discussion of Background Information

In such a stack storage assembly, containers can be stacked in the container stacking spaces. The container stacking spaces are here preferably arranged in the form of a matrix with rows and columns. If a container is to be stored in a container stacking space, it is arranged on the hoisting device of the charging vehicle. The charging vehicle then travels through the charging space until it is located under a predetermined or desired container stacking space. The hoisting device then lifts the container until it has passed by the retaining device. While the container is being lifted, the retaining element is moved into the release position. As soon as the container or a part of the container that is responsible for subsequently retaining the container in the retaining device has passed by the retaining device, the retaining element can be relocated to the retaining position once more. If the retaining device is lowering the container, the retaining element engages with the container, and fixedly retains the container against the effect exerted by the force of gravity. The charging vehicle can then be moved away under the corresponding container stacking space. If one or several containers had previously already been located in the container stacking space, the entire stack is lifted while lifting the hoisting device as soon as the lifted container comes into contact with the lowermost container of the stack. Otherwise, the storage process is identical.

The charging vehicle is used once again when taking the container out of the container stacking space. The charging vehicle is driven under the container stacking space, and the hoisting device is lifted until it comes into contact with the lowermost container of a container stack in the container stacking space. The hoisting device then lifts the container, if necessary with the stack of additional containers located thereon. As soon as the retaining device is unloaded, the retaining element can be moved into the release position. The container stack is then lowered.

However, the retaining element must be held in the release position for the time in which the lower container passes the retaining device.

SUMMARY

Embodiments enable removal of a container from a container stacking space in an easy manner.

In embodiments, the charging vehicle of the storage stack assembly has at least one fixing element that can be relocated into a fixing position, interacts in the fixing position with a retaining element located in the release position, and holds the retaining element in the release position.

In addition to the actuating device that moves the retaining element into the release position, a fixing element is arranged on the charging vehicle. As soon as the retaining element is in the release position, it can be fixed there by the fixing element, so that the container to be removed can pass by the retaining device. As soon as it is no longer necessary for the retaining element to be held in the release position, the fixing element can be removed, so that the retaining element can be moved into the retaining position once again.

The charging vehicle preferably has a controller, which actuates the fixing element when the retaining element is in the release position. The controller thus ensures a specific sequence of operations if a container is to be removed from the container stacking space. The actuating device must first move the retaining element out of the retaining position into the release position. Only thereafter can the fixing element be actuated to hold the retaining element in the release position.

In a preferred embodiment, the retaining element is designed as a two-armed lever, with a first arm having a support surface for a container and a second arm, and the fixing element acts on the second arm. The fixing element is then not located under the support surface for the container, and as a result cannot disrupt the movement of the container.

The retaining element is preferably arranged in a retainer arranged between the container stacking space and the charging space, and the fixing element can be moved in an intermediate space between the retaining element located in the release position and the retainer. The retaining element can then be supported on the retainer via the fixing element. For example, the retainer can be designed as a frame, which surrounds one or several openings at the lower end of one or more container stacking spaces.

The fixing element preferably has a tapering tip. This makes it easier for the fixing element to move. Even if the charging vehicle is not located precisely in a desired position under the container stacking space, it is possible to move the fixing element in such a way that it can interact with the retaining element located in the release position.

The retainer preferably has a guide for the fixing element. The tapering tip can then enter into the guide. Given further movement, the fixing element is automatically guided into the desired position, in which it can retain or fix the retaining element located in the release position.

It is here preferred that the guide have a channel, which is arranged under the retaining element and outside of a container movement path. For example, the channel can be designed as a borehole in a plate or some other part of the retainer.

In a non-actuated position perpendicular to the direction of gravity, the fixing element preferably protrudes less far over the charging vehicle than in an activated position. If it is not required for fixing the retaining element in the release position, the fixing element is thus inserted into the charging wagon, as it were. In an ideal case, the outer contour of the charging wagon, meaning the contour of the charging wagon transverse to the direction of gravity, is not enlarged by the fixing element in the non-actuated position.

It is here preferred that the fixing element be guided in a curve guide formed on the charging vehicle. This is a simple option for moving fixing elements out of the contour of the charging vehicle when lifted opposite the direction of gravity, and introducing it back into the space within the contour of the charging vehicle when lowered in the direction of gravity. The charging vehicle itself can then be configured relatively precisely to the requirements in the charging space, for example to the fact that the container stacking spaces are laterally bordered by supports, which extend down to a floor on which the charging vehicle in the charging space can be moved.

The lifting device preferably has a lifting frame with a container footprint, wherein the lifting frame forms at least a part of the actuating device. For example, additional movable elements are no longer required for moving the retaining element from the retaining position into the release position. If a container is stored in a container stacking space, the retaining element is opened by the container itself while lifting the container. If the container is to be removed from the charging space, the retaining element is opened by the lifting frame, and held by the fixing element in an opened position, i.e., in the release position.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 6A-6D show an illustration for explaining the storage of a container in a container stacking space;

FIGS. 7A-7D show a schematic illustration for explaining a removal of a container from a container stacking space; and FIGS. 8A and 8B show a schematic illustration for explaining how the fixing element works.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
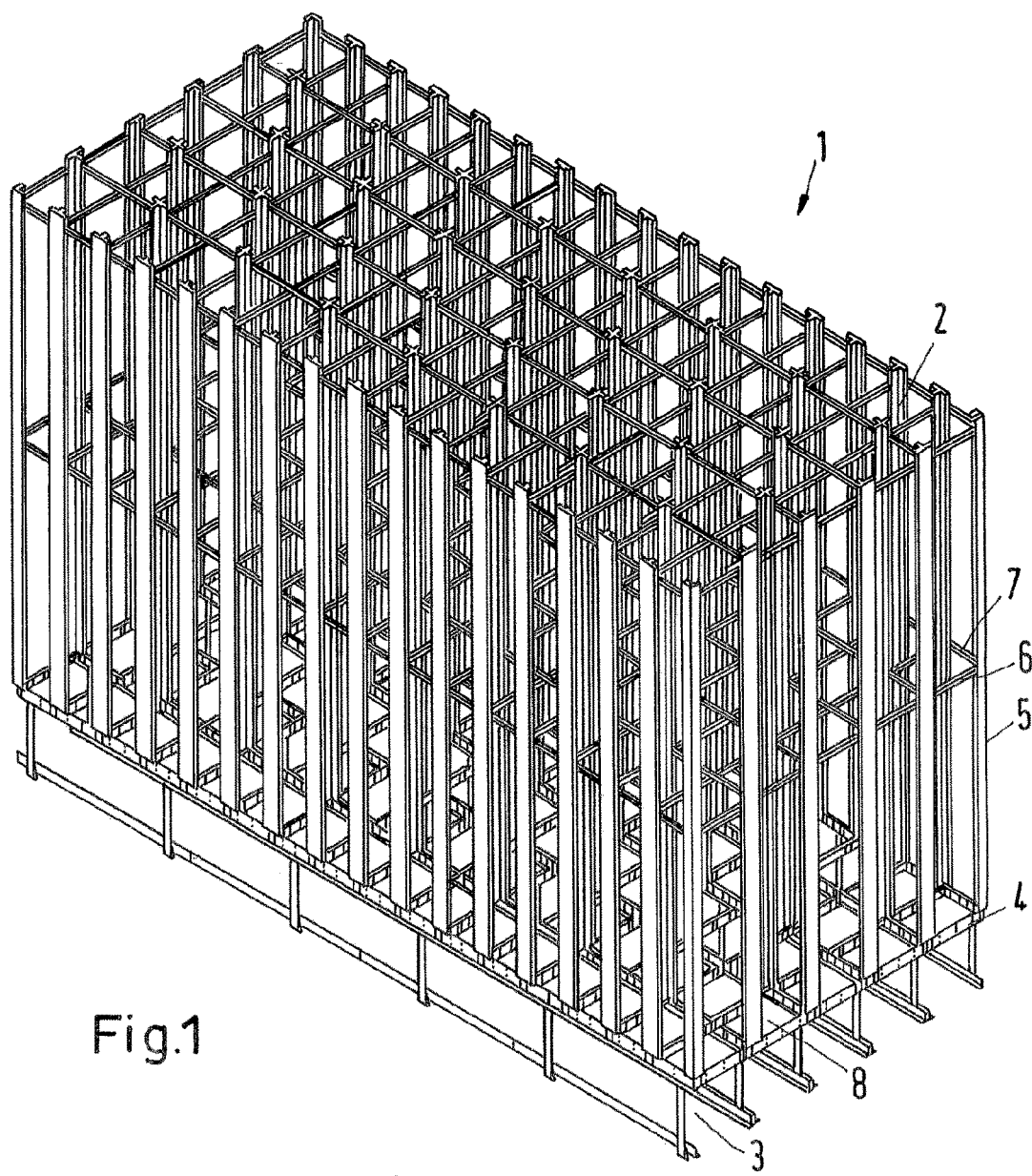
FIG. 1 shows a perspective, schematic view of a stack storage assembly.
Figure 2:
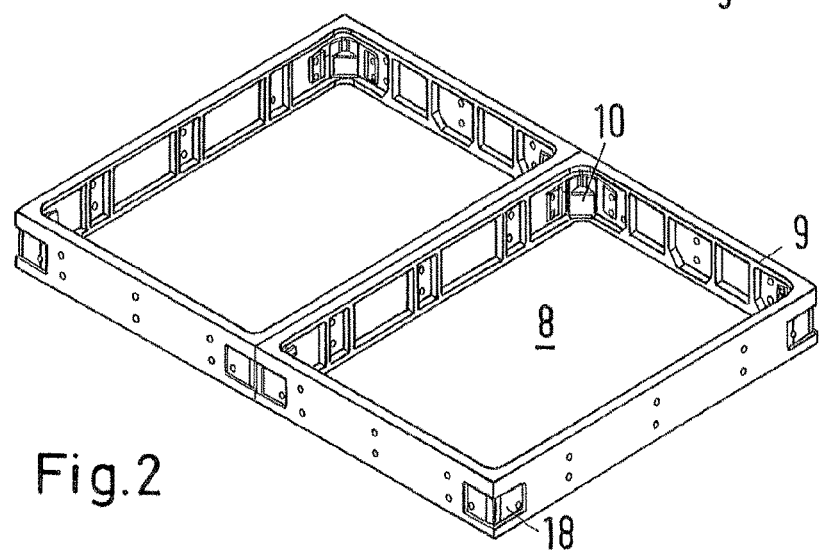
FIG. 2 shows a perspective illustration of a frame assembly at the lower end of container stacking spaces.

FIG. 1 shows a stack storage assembly 1 with a plurality of container stacking spaces 2. A charging space 3 is arranged at the bottom of the container stacking spaces 2 in the direction of gravity. A frame assembly 4 is provided between the charging space 3 and the container stacking spaces 2.

The stack storage assembly 1 has a plurality of vertically arranged braces 5, which are connected with each other by horizontal cross braces 6, 7.

Formed at the bottom of each container stacking space 2 is an opening 8, which is provided in the frame assembly 4. To this end, the frame assembly 4 has several braces 9 in the form of frame elements, for example which can be screwed with each other. Retaining elements 10 are arranged in each corner of the frame element. The four retaining elements of a frame element then comprise a retaining device. The retaining elements 10 and their function will be explained in more detail further below.

Figure 3:
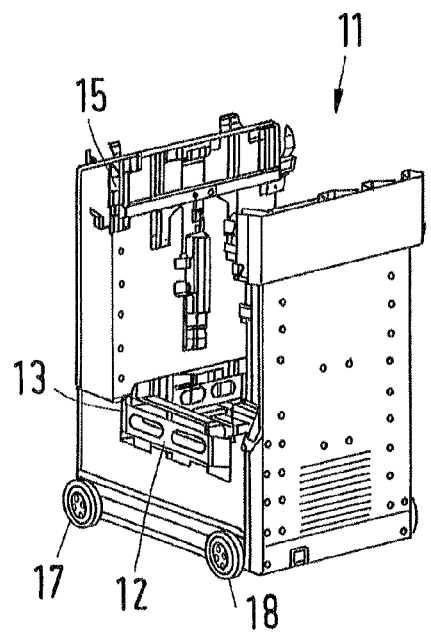
FIG. 3 shows a charging vehicle belonging to the stack storage assembly.
Figure 4:
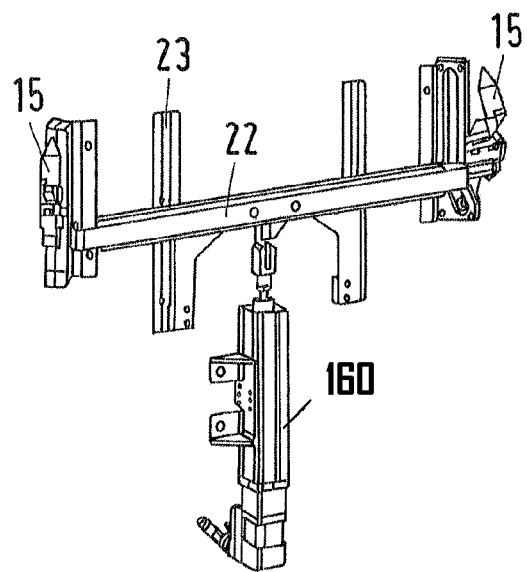
FIG. 4 shows a schematic illustration of a fixing device with fixing elements.

For reasons of clarity, FIG. 1 does not show a charging vehicle 11, which belongs to the stack storage assembly 1. The charging vehicle 11 is shown on FIG. 3.

The charging vehicle 11 has a hoisting frame 12, which can be lifted and lowered via a hoisting drive not shown in any more detail. The hoisting frame 12 has a container footprint 13, on which a container 14 shown on FIGS. 6 and 7 can be placed.

In addition to the hoisting platform 12 and its hoisting drive, the charging vehicle 11 also has several fixing elements 15, which can be lifted and lowered via a fixing element drive 160. The charging vehicle 11 further has several wheels 17, 18, which can be used to move the charging vehicle 11 in the charging space 3.

Figure 5A:
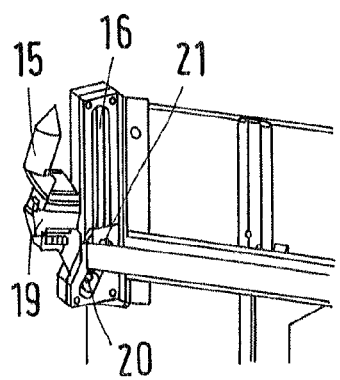
FIGS. 5A-5C show a schematic illustration for explaining the movement of a fixing element.
Figure 5B:
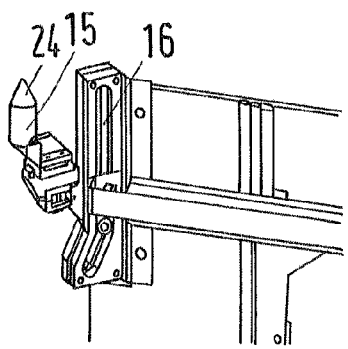
Figure 5C:
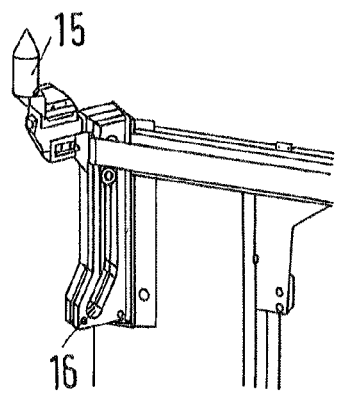

As shown in FIGS. 5A-5C, each fixing element 15 is guided in a curve guide 16. The fixing element 15 is here arranged on a carrier 19, which is guided in the curve guide 16 via two rollers 20, 21. When the fixing element 15 is lifted by the fixing element drive 160, it is relocated from the non-actuated position on FIG. 5A, through the position in FIG. 5B, and into an actuated position shown on FIG. 5C. It is here moved out of the charging vehicle 11 transverse to the direction of gravity. When the fixing element 15 is lowered again, it is again moved into the charging wagon 11 perpendicular to the direction of gravity. In this way, the fixing element 15 can be prevented from protruding over the outer contour of the charging wagon 11 perpendicular to the direction of gravity when the charging wagon 11 is moved in the charging space 3. The fixing element drive 160 simultaneously acts on two fixing elements 15. To this end, the two fixing elements 15 are connected with each other via a cross member 22. The cross member 22 is in turn guided in linear guides 23. The fixing element drive 160 can also have a cover in a manner not shown in more detail.

The fixing element 15 has a tapering tip 24, the operating principle of which will be explained further below. Otherwise, it can have a cylindrical shape, or cross sectionally a polygonal shape.

FIGS. 6A-6D show how a container 14 is stored in a container stacking space 2.

As shown, an additional container 25 is already located in the container stacking space 2. This additional container 25 is supported on the retaining elements 10 located in the corners of the retainer 9. Only a single retaining element 10 is shown.

The retaining element 10 is designed as a two-armed lever with a first arm 26, which has a container footprint 27, and a second arm 28. The retaining element is mounted so that it can pivot around an axis 29.

Below the second arm 28, the retainer 9 has a guide 30 into which the fixing element 15 can enter when it is lifted. The guide 30 is arranged outside of a movement path for the container 14.

FIG. 6A shows the starting position, in which the container 14 to be stored in the container stacking space 2 is moved closer to the container 25 already located in the container stacking space 2 from below. On FIG. 6B, the new container 14 has contacted the container 25 already located in the container stacking space.

FIG. 6C shows how the two containers 14, 25 are lifted together. The container 14 to be newly stored here comes into contact with the retaining element 10, more precisely with the first arm 26 of the retaining element 10, and pivots the retaining element 10 out of the retaining position shown on FIG. 6A to 6C into the release position shown on FIG. 6D. In the release position of the retaining element 10, the container 14 can be moved past the retaining element 10. The container 14 here forms an actuating device together with the hoisting frame 12, which lifts the container 14.

The container 14 to be newly stored is further lifted by the hoisting platform 12 of the charging wagon 11 until a retaining geometry 31 of the container 14 has passed the retaining element 10. The retaining element 10 then returns to the retaining position (FIG. 7A), so that the container 14 can support itself on the retaining element 10. If necessary, the movement of the retaining element 10 from the release position (FIG. 6D) back into the retaining position (FIG. 7A) can be supported by a spring not shown in any more detail.

FIGS. 7A-7D show how the container 14 is removed from the container stacking space 2.

The hoisting platform 12 is lifted until it contacts the container 14. The container 14 then stands on the container footprint 13. The retaining element 10 protrudes into a recess 32 at the bottom of the container 14, which is arranged in the area of the retainer geometry 31.

If the hoisting frame 12 is lifted further, the load on the retaining element 10 is initially lifted by the container 14. The retaining element 10 is then load-free. If the hoisting frame 12 is lifted further, it can pivot the retaining element 10 into the release position. In this case, the hoisting frame 12 alone comprises the actuating device.

In order to prevent the retaining element 10 from moving back into the retaining position when the hoisting frame 12 is lowered, the fixing element 15 is actuated in the position shown in FIG. 7D.

The effect is shown on FIGS. 8A and 8B. FIG. 8A shows the retaining element 10 in the retaining position, in which a container 14 can rest on the supporting surface 27 of the first arm 26. FIG. 8B shows the release position, in which the retaining element 10 is held by the fixing element 15. The fixing element 15 has here been moved through the guide 30. The bottom of the guide 30 can have a rounded or conical design, so as to make it easier to thread the tip 24 of the fixing element 15. The guide 30 ensures that the fixing element 15 is moved between the retainer 9 and the second arm 28 of the retaining element 10 during the lifting process. The fixing element 15 here acts on the second arm 28 and prevents the second arm 28 from being able to be pivoted in the direction toward the retainer 9 again.

Instead of the retainer 9, use can also be made of other options for holding the retaining element 10.

The hoisting drive of the hoisting frame 12 (not shown in any more detail) and the fixing element drive 160 are connected with a controller, which is also not shown in any more detail. The controller ensures that the fixing element 15 can only be moved into the fixing position shown on FIG. 8b when the retaining element 10 is in the release position. For example, this can be ensured by using a sensor that determines the position of the retaining element 10, or by monitoring the lifting path of the hoisting device for the hoisting frame 12, wherein the fixing element 15 can only be lifted if the hoisting frame 12 has been lifted to an extent where it has pivoted the retaining element 10 into the release position, i.e., the opened position.

As evident in FIGS. 8A and 8B, the second arm 28 of the retaining element 10 abuts against the retainer 9 from below in the direction of gravity in the retaining position. The retainer 9 is used both to provide a limit on the movement of the retaining element 10 in the retaining position, as well as to form a support for the fixing element 15 when the retaining element 10 is in the release position. Since the fixing element 15 is supported by the retainer 9, it can be given relatively weak dimensions. It must only be able to fill out the intermediate space between the retainer 9 and the second arm 28 of the retaining element 10 when the retaining element 10 is in the release position shown on FIG. 8B.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A stack storage assembly comprising:
    a plurality of container stacking spaces;
    a charging space, which is arranged below the plurality of container stacking spaces in a direction of gravity; and
    a charging vehicle, which is movable in the charging space, having a hoisting device to move a container into one of the container stacking spaces or out of one of the container stacking spaces,
    wherein each of the plurality of container stacking spaces has, at a lower end in the direction of gravity, a retainer with at least one retaining element, which is movable, via an actuator arranged on the charging vehicle, between a retaining position in which the at least one retaining element holds the container arranged in the one of the container stacking spaces against the force of gravity, and a release position in which the container is movable past the retaining element, and
    wherein the charging vehicle has at least one fixing element and, after the at least one retaining element has been positioned in the release position, the at least one fixing element is positionable to interact with and hold the at least one retaining element in the release position.

2. The stack storage assembly according to claim 1, wherein the charging vehicle is configured to actuate the fixing element when the at least one retaining element is in the release position.

3. The stack storage assembly according to claim 1, wherein the at least one retaining element comprises a two-armed lever having a first arm with a support surface for the container and a second arm on which the fixing element acts.

4. A stack storage assembly comprising:
a plurality of container stacking spaces;
a charging space, which is arranged below the plurality of container stacking spaces in a direction of gravity; and
a charging vehicle, which is movable in the charging space, having a hoisting device to move a container into one of the container stacking spaces or out of one of the container stacking spaces,
wherein each of the plurality of container stacking spaces has, at a lower end in the direction of gravity, a retainer coupled to at least one retaining element, which is movable, via an actuator arranged on the charging vehicle, between a retaining position in which the at least one retaining element holds the container arranged in the one of the container stacking spaces against the force of gravity, and a release position in which the container is movable past the retaining element,
wherein the charging vehicle has at least one fixing element positionable into a fixing position to interact with the at least one retaining element while located in the release position to hold the at least one retaining element in the release position,
wherein the at least one retaining element is arranged in the retainer arranged between the container stacking space and the charging space, and
wherein, in positioning the at least one fixing element into the fixing position, the at least one fixing element is movable in an intermediate space between the at least one retaining element located in the release position and the retainer.

5. The stack storage assembly according to claim 4, wherein the at least one fixing element has a tapering tip.

6. The stack storage assembly according to claim 5, wherein the retainer has a guide for the at least one fixing element.

7. A stack storage assembly comprising:
a plurality of container stacking spaces;
a charging space, which is arranged below the plurality of container stacking spaces in a direction of gravity; and
a charging vehicle, which is movable in the charging space, having a hoisting device to move a container into one of the container stacking spaces or out of one of the container stacking spaces,
wherein each of the plurality of container stacking spaces has, at a lower end in the direction of gravity, a retainer coupled to at least one retaining element, which is movable, via an actuator arranged on the charging vehicle, between a retaining position in which the at least one retaining element holds the container arranged in the one of the container stacking spaces against the force of gravity, and a release position in which the container is movable past the retaining element,
wherein the charging vehicle has at least one fixing element and, after the at least one retaining element has been positioned in the release position, the at least one fixing element is positionable to interact with and hold the at least one retaining element in the release position by moving the at least one fixing element in an intermediate space between the at least one retaining element located in the release position and the retainer,
wherein the at least one fixing element has a tapering tip,
wherein the retainer has a guide for the at least one fixing element, and
wherein the guide has a channel, which is arranged under the at least one retaining element and outside of a container movement path.

8. The stack storage assembly according to claim 1, wherein the at least one fixing element, in an actuated position, protrudes farther above the charging vehicle than in a non-actuated position, in which the at least one fixing element is arranged perpendicular to the direction of gravity.

9. The stack storage assembly according to claim 8, wherein the at least one fixing element is guided in a curve guide formed on the charging vehicle.

10. The stack storage assembly according to claim 1, wherein the hoisting device has a hoisting frame with a container footprint, wherein the hoisting frame forms at least a part of the actuator.

11. A method storing or removing a container in or from a stack storage assembly comprising:
moving a charging vehicle into a charging space below a container stacking space in a direction of gravity;
lifting a platform of the charging vehicle upwardly against the direction of gravity;
moving at least one retaining element, which is located at a lower end of the container stacking space and is movable between a retaining position, at which the at least one retaining element holds the container in the container stacking spaces, and a release position, at which the container is movable past the at least one retaining element,
wherein, in storing the container in the container stacking space, the method further comprises moving, via contact with the container, the at least one retaining element into the release position, and
wherein in removing the container from the container stacking space, the method further comprises moving, via contact with the platform of the charging vehicle, the at least one retaining element into the release position, and thereafter, moving at least one fixing element to interact with a part of the at least one retaining element opposite the platform in order to hold the at least one retaining element in the release position.

12. The method according to claim 11, wherein, to retain the container in the container stacking space:
after moving of the at least one retaining element into the release position, the method further comprises:
continuing to lift the container in the container stacking space until the container moves past the at least one retaining element, whereby the at least one retaining element returns to the retaining position, and
lowering the container onto the at least one retaining element in the retaining position.

13. The method according to claim 11, wherein, to remove the container from the container stacking space:
while holding the at least one retaining element in the release position via the at least one fixing element, the method further comprises:
lowering the container past the at least retaining element and onto the platform of the charging vehicle.

* * * * *